United States Patent [19]
Mathivat et al.

[11] Patent Number: 6,092,393
[45] Date of Patent: *Jul. 25, 2000

[54] METHOD FOR HEATING MOVING GLASS SHEETS

[75] Inventors: Denis Mathivat; Jean-Marc Petitcollin, both of Thourotte, France

[73] Assignee: Saint-Gobin-Vitrage International, Couverboie, France

[*] Notice: This patent is subject to a terminal disclaimer.

[21] Appl. No.: 08/082,163

[22] Filed: Jun. 28, 1993

Related U.S. Application Data

[63] Continuation of application No. 07/866,458, Apr. 10, 1992, abandoned, which is a continuation of application No. 07/655,799, Feb. 15, 1991, Pat. No. 5,122,180.

[30] Foreign Application Priority Data

Feb. 21, 1990 [FR] France ............................ 90 02089

[51] Int. Cl.[7] .......................... C03B 23/023; C03B 29/08
[52] U.S. Cl. ................................ 65/106; 65/111
[58] Field of Search .......................... 65/106, 107, 111

[56] References Cited

U.S. PATENT DOCUMENTS

| | | | |
|---|---|---|---|
| 4,601,743 | 7/1986 | Canfield | 65/162 |
| 4,824,464 | 4/1989 | Perin et al. | 65/350 |
| 4,952,227 | 8/1990 | Herrington et al. | 65/162 |
| 5,173,102 | 12/1992 | Weber et al. | |
| 5,470,367 | 11/1995 | Salonen et al. | |

*Primary Examiner*—Steven P. Griffin
*Attorney, Agent, or Firm*—Onlon, Spivak, McClelland, Maier & Neustadt, P.C.

[57] ABSTRACT

A furnace for heating glass sheets moving along the axis of the furnace has at least one differentiated heating cell, the heating elements of which disposed at the vault side are constituted of sets of electrical resistors controlled in temperature or in power independently for each set. A portion of the electrical resistors are mounted parallel to the axis of the furnace, the other heating cells each constituting a longitudinal heating zone independent of the other longitudinal zones and having, at the vault side, heating elements composed of sets of electrical resistors subdivided into several independent transverse sub-zones, in which the electrical resistors are mounted perpendicularly to the axis of the furnace. The invention is applicable to the manufacture of curved and toughened panes.

4 Claims, 3 Drawing Sheets

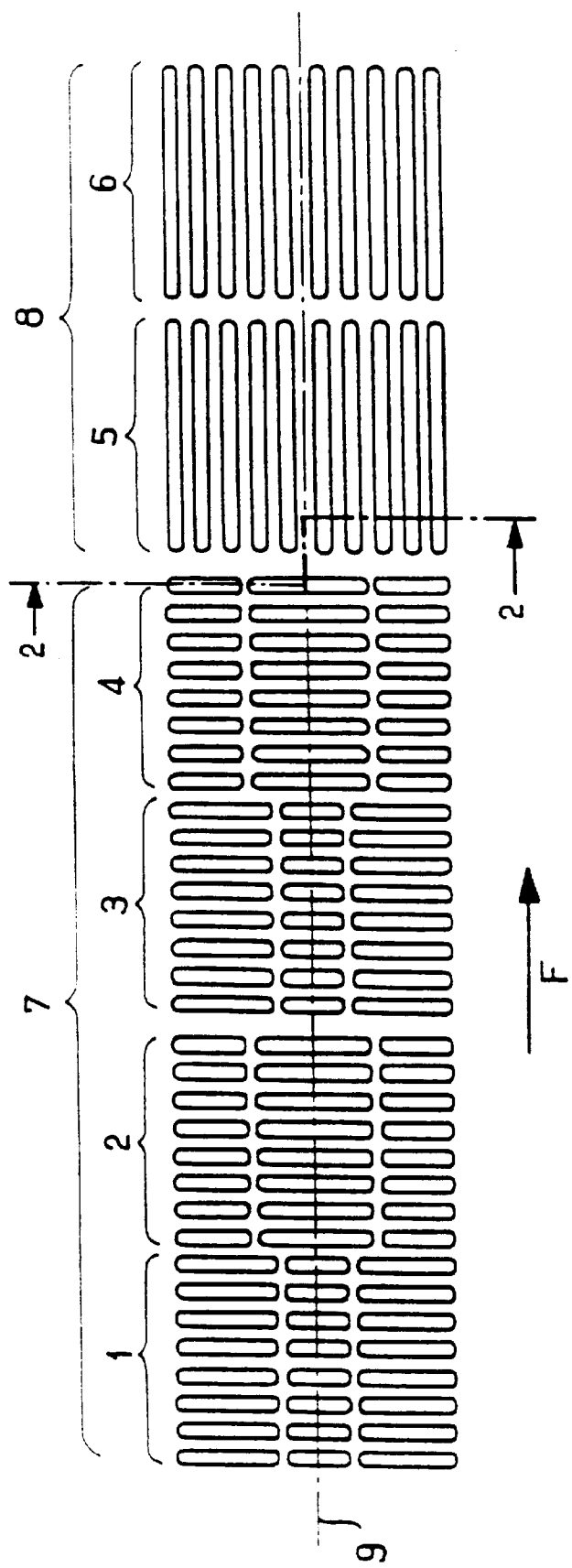
FIG_1

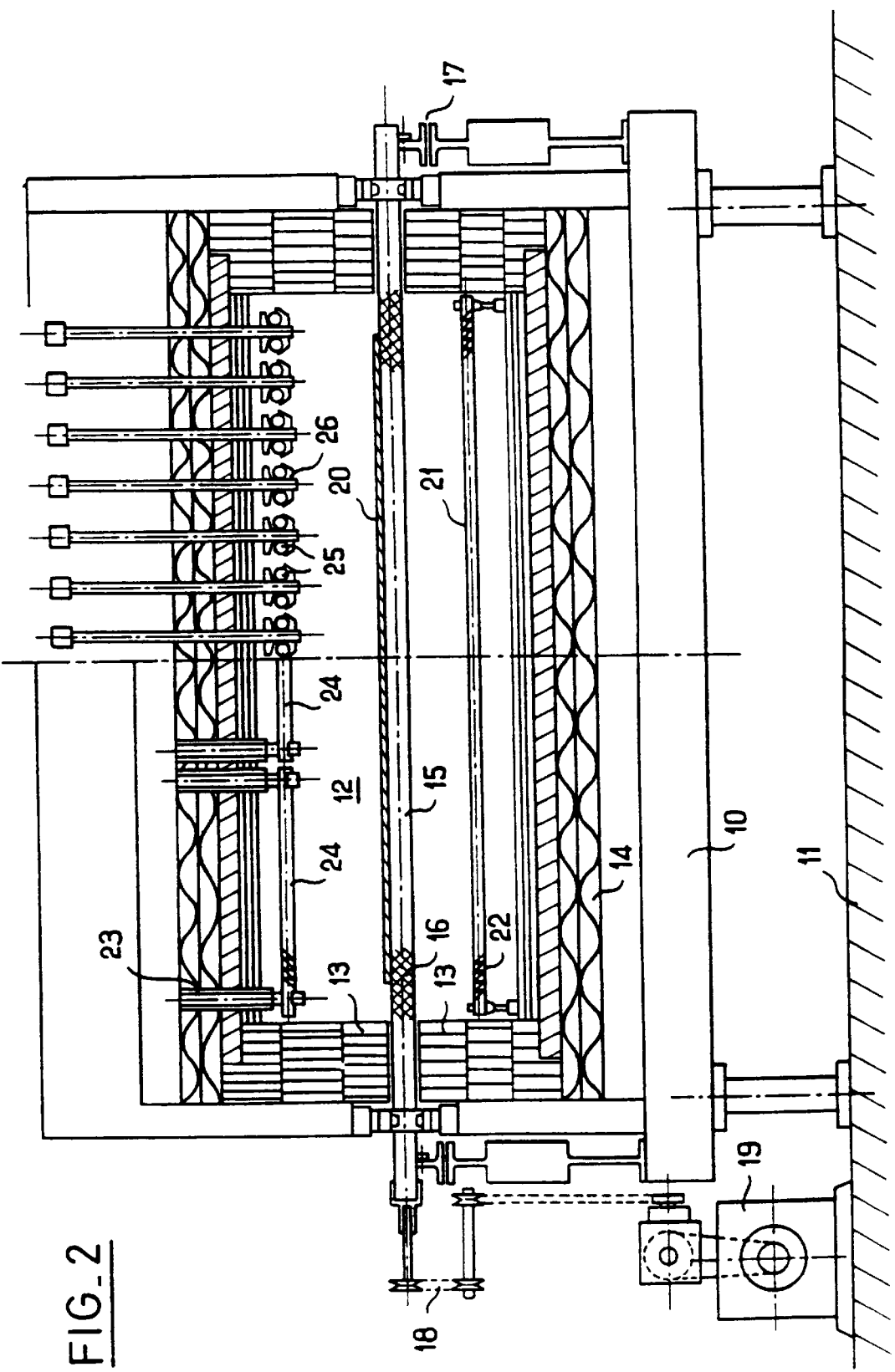
FIG_2

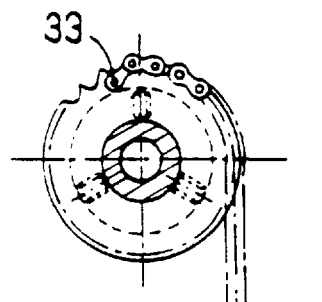
FIG_3
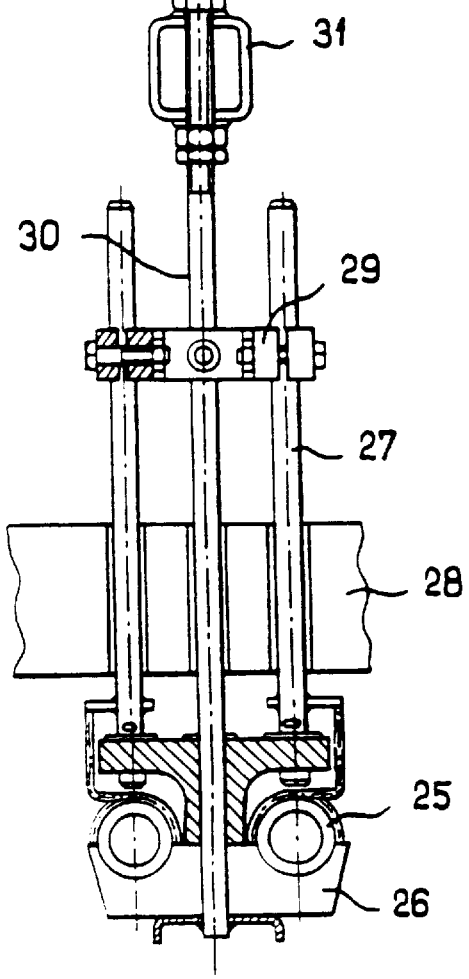

METHOD FOR HEATING MOVING GLASS SHEETS

This application is a Continuation of application Ser. No. 07/866,458, filed on Apr. 10, 1992, now abandoned, which is a Continuation of application Ser. No. 07/655,799, filed on Feb. 15, 1991, now U.S. Pat. No. 5,122,180.

BACKGROUND OF THE INVENTION

1. Field of the Invention

This invention relates to techniques for heating glass sheets for the purpose of a thermal treatment by rapid cooling of the thermal toughening type—or by slow cooling of the annealing type—optionally associated with shaping. These heating techniques are preferably applied to installations intended for the production of curved glazing for automobile vehicles.

2. Description of the Related Art

The hot treatments for glass sheets supported in a horizontal position, such as those listed above, demand very strict control of the heating of the glass. A temperature deviation of about ten degrees within the glass, a value that can be compared with the exit temperature from the furnace which itself exceeds 600° C., is sufficient to cause a modification in the performance of the glass and to generate defects, notably variations in the curvature after the shaping step. To this accuracy required for heating, there must be added also the need, in this case of an economic nature, for production at high output rates, which presupposes that the dwell time of the glass sheets in the furnace shall be limited to the strict minimum. As a general rule, the furnaces are of the type known as straight-through, that is to say the glass sheet passes through them from one end to the other, while being kept moving by means provided for causing the glass sheet to pass through the various heating units. In vertical installations, these means are essentially composed of tongs that travel along a rail. These tongs enable the position of the glass in the furnace to be controlled very accurately, which represents an important advantage where the following step consists of a curving operation, especially if the desired shape is complex, the curving then most commonly comprising at least one pressing phase. These tongs, however, leave marks that are unacceptable according to the highest quality standards, which are almost always required by present-day automobile manufacturers.

In these conditions, the installations of the horizontal type are gradually being replacing those of the vertical type. In horizontal-type installations, the means for moving the glass sheets through the furnace are, generally, composed of motor-driven rollers on which the glass sheets rest in a horizontal or substantially horizontal position, or equivalent conveying means.

In European Patent Application EP-A-241 356 there is described, for example, a furnace having two, i.e., upper and lower, heating layers composed of electrical resistors placed on either side of the path followed by the glass sheets, each layer being divided into several independent longitudinal zones, themselves divided into transverse sub-zones which are regulated independently and disposed in such a manner that the separating spaces between the transverse sub-zones do not constitute "cold" bands parallel to the direction of the glass sheets. The electrical resistors are formed of wires wound around silica tubes, these tubes being oriented parallel to the width of the furnace, or in other words perpendicular to the general direction of movement of the glass sheets passing through the furnace. Such an arrangement of the resistors is especially well adapted to the uniform heating of the glass sheets or to a differentiated heating of the central parts and of the edges of the glass sheet. However, this differentiation of temperatures is possible only for fairly wide portions of the area, each portion of the glass sheet covering, for example, at least 10% of the total area. Since the quality requirements are gradually evolving towards the total elimination of marks from tongs, this type of horizontal furnace is being employed also for those cases where shaping takes place to very small radii of curvature with the virtual formation of folds, notably those that are most difficult to produce, that is folds localized near the edges of the glass sheets.

In these cases, it is no longer a matter of differentiated heating of a whole portion of the area. In contrast, it becomes necessary to control virtually point by point the temperature of the glass sheets; this for the purpose of defining, for example, fold lines needing extra heating in order to locally increase the plasticity of the glass.

A known earlier method of localized extra heating consists of covering the surface of the glass sheet, along the fold line, with a black object such as carbon powder, so that the glass locally absorbs more heat. The deposition of this black object, however, requires additional equipment, and furthermore the extra heating is dictated by the temperature of the remainder of the glass sheet and by the nature of the black object, and so there is a lack of flexibility.

It is also known to use extra heating means integral with the furnace and not on the glass sheets. In U.S. Pat. No. 4,441,907 it has been proposed to use gas nozzle pipes mounted on a movable carriage which moves parallel to the direction of movement of the glass sheets: when the gas nozzle pipes come into action, generally in the downstream part of the path of the glass sheet, they are fixed relative to the sheet, thus enabling a narrow band of the glass surface to be preferentially heated. On the other hand, this system requires a precision mechanical system for perfectly synchronizing the movements of the glass and the carriage, and for operating reproducible controls for positioning the gas nozzle pipes. Furthermore, the time during which a carriage with its gas nozzle pipes is immobilized is very long (the time for additionally heating the glass and the time for returning to the starting position). The system known from U.S. Pat. No. 4,441,907 therefore requires a very wide spacing between two glass sheets.

There has also been proposed, in German Patent Application DE-A-37 42 481 a device enabling bands parallel to the direction of feed of the glass to be given additional heating locally. For this purpose, the furnace is equipped with additional heating means composed of heating bars extending essentially parallel to the length of the furnace and suspended from the ends of rods which penetrate to a greater or lesser extent into the furnace and perpendicularly to its length. Progressively as the glass sheet passes through the additional heating zone, the bars are moved further apart—or in contrast brought nearer together—so that a continuous band of the glass sheet is additionally heated. With an extra heating device of this type, the dead time between two panes is advantageously less than with the device described above. Nevertheless, this device does require a furnace sufficiently wide to permit the introduction of the glass sheets across the furnace, in order that the shorter sides—along which the fold lines are disposed in the majority of models—are well situated parallel to the longitudinal direction of the furnace.

Moreover, these localized extra heating devices, known from U.S. Pat. No. 4,441,901 and German DE-A-37 42 481, comprise many elements which are cantilever mounted. In view of the temperature of the furnace, these elements are therefore very sensitive to deformation, with the consequence that the heating parameters for the glass sheets may change in the course of time and adjustments may need to be made for each series of panes, even though this series has already been produced on the line.

SUMMARY OF THE INVENTION

This invention has as an object a method for heating glass sheets, which makes possible a differentiated heating of certain zones of the glass sheets and which does not possess the aforementioned drawbacks of the devices known in the art, in particular a method in which the adjustments are perfectly reproducible from one production series to another.

This invention relates to a furnace which comprises one or more differentiated heating cells, of which the heating elements disposed at the upper or vault side of the furnace are composed of cells of electrical resistors governed in temperature or power independently for each cell, at least a portion of said electrical resistors being mounted to extend parallel to the axis of the furnace. This furnace also comprises other heating cells constituting a principal longitudinal heating section independent from the differentiated heating section, each of these cells possessing, at the vault side, heating elements constituted of sets of electrical resistors subdivided into several independent transverse sub-zones, in which the electrical resistors are mounted perpendicularly to the axis of the furnace. In other words, the furnace of this invention is a furnace of the type described in European Patent Application EP-A-241 356, but in which one or more longitudinal cells is replaced by one or more differentiated cells having at least a portion of its resistors orientated parallel to the direction of travel of the glass. In these longitudinal heating sections having the differentiated cells, a very large number of transverse sub-zones are therefore obtained—in practice as many as the number of sets of resistors, whereas this number is generally limited to three in the known case of European Patent Application EP-A-241 356.

In the context of this invention, the term electrical resistor is to be understood to especially mean refractory ceramic tubes, around which electrically conducting wires are wound, hollow quartz tubes enclosing heating filaments, small heating elements, preferably square, capable of being assembled in chess-board patterns or any other equivalent means known to the person skilled in the art, the sole critical point being that these means must have a predominantly longitudinal orientation, so that these means or groups of means are analogous to a resistor tube with respect to the areas heated.

As indicated above, the differentiated heating cell according to this invention has, in the most common case, the function of additionally heating the edges parallel to the direction of advance of the glass sheets, this function being assured by the resistors mounted in longitudinal arrangement. Opposite the central part of the glass sheet there may be provided resistors mounted in transverse arrangement, so that the movement of the glass is sufficient for homogenizing its temperature in this central part, or resistors also mounted in parallel arrangement. This latter device increases the versatility of the furnace, which can then be used for additionally heating the edges of glass objects of large or small area; for eliminating any risk of lack of uniformity of temperature in the central part, it is then generally preferable to locate the differentiated heating cell of this invention at a point along the path of the glass sheet which corresponds to the reaching of a temperature greater than the plastic deformation temperature.

Ideally, the furnace according to this invention allows the advantages of a furnace such as that described in European Patent Application EP-A-241 356 to be combined with the advantages of the differentiated heating elements, such as those described in U.S. Pat. No. 4,441,907 or German DE-A-3 742 481, without necessitating the introduction of new equipment into the furnace.

In the case of a multi-cell furnace, it is self-evident that the furnace is equipped with means for causing the glass sheets to advance from one heating cell to the next, along the axis of the furnace.

In a preferred variant of the invention, means are also provided for regulating the height of the position of the sets of electrical resistors, so that the heating profiles that can be obtained may vary in a three-dimensional space and not solely in two dimensions. The height of a resistor with respect to the glass sheet may advantageously be adjusted between 10 and 300 mm, the minimum height depending essentially upon the deformation under heat of the resistor and of the resistor support means. In order to do this, each set is, for example, composed of one or more tubes, so that the width of the set may be modulated, the tubes being mounted on a single cradle, the height of which can be adjusted with respect to the conveying plane for the glass sheets, for example between 20 and 300 mm, this adjustment being carried out by manual or automatic controls from outside the furnace.

The multi-cell furnace according to this invention enables the heating conditions for a glass sheet to be modified by varying three independent parameters: the heating power given out by the resistors, their height and the dwell time of the glass sheet in the furnace, beneath the heating elements.

This multi-cell furnace may advantageously be used as a furnace of the type known as a toughening furnace, intended for heating, one by one, glass sheets above their plastic deformation temperature for the purpose of a thermal toughening treatment, said sheets being conveyed in a horizontal position from one end to the other of the furnace by a horizontal conveyor composed, for example, of a series of motorized rollers. The thermal toughening treatment is, if desired, preceded by a curving operation, which also makes use of the heating of the glass. The furnace may also be intended for the production of enamelled glass sheets, the enamelling composition being applied onto the cold glass sheet and being baked in the furnace, it being possible, of course, for this enamelling operation to be followed by a curving and/or thermal toughening operation. The multi-cell furnace according to this invention may also be used for heating glass sheets one by one, or superimposed in pairs, for the purpose of assembling them together with a sheet of plastics material.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a schematic view from above of a portion of a furnace according to this invention;

FIG. 2 is a stepped section through a furnace of the invention, seen from an angle analogous to that of section 2—2 of FIG. 1; and FIG. 3 is a detailed showing a support cradle for electrical resistance heating tubes and of its height adjustment device.

DETAILED DESCRIPTION OF THE PREFERRED EMBODIMENTS

FIG. 1 is a schematic view from above of a multi-cell furnace, intended more especially for curving and toughening installations. In this furnace, the glass sheets pass through without stopping, along the direction indicated by arrow F, and are, for example, conveyed by a series of motorized rollers.

According to this invention, the elongate heating elements—associated with the upper or vault part of the furnace and indicated schematically in FIG. 1—are arranged in such a way as to create a specific heating profile. The furnace shown here comprises 6 heating cells, numbered 1 to 6. These heating cells are each formed of a number of heating elements and are subdivided into a principal heating section 7 corresponding to the first four cells 1, 2, 3, 4 and a differentiated heating section 8.

The heating elements of the cells are composed of refractory ceramic tubes, for example tubes of silica or alumino-silicates, around which metal wires are wound. Preferably, these resistors are fitted also to the furnace hearth or they are mounted, for example, perpendicularly to the axis 9 of the furnace. For the hearth, tubes that are mounted fixed may be used, the ends of which do not project outside the furnace. Preferably, the resistors of the hearth are also subdivided into zones, for example 6 in number, each zone being supplied with electrical power independently of the other zones. The walls of the furnace parallel to the axis 9 are preferably also equipped with fixed-mounted resistor tubes. All these arrangements are well known in the art and do not require any particular comment.

In the principal heating section 7, the electrical resistors associated with the furnace vault are mounted fixed and are disposed transversely, that is perpendicularly to the general direction of feed of the glass sheets. According to the teachings of European EP-A-241 356, all the cells of the principal heating section 7 are independent from the aspect of electrical power supplied thereto and are each subdivided into three transverse sub-zones, any two contiguous cells being so arranged that the intermediate separating spaces within either cell, between two transverse sub-zones of that cell, are not in alignment with the spaces of the other of the two cells, in order to avoid the forming of "cold" bands parallel to the axis 9 of the furnace.

Following this principal section 7, in which the glass sheets are heated homogeneously or with a slight differentiation between the central part and the lateral parts of the sheets, the glass sheets enter the differentiated heating section 8. This section 8 is composed of two cells 5, 6, having heating elements defining longitudinal heating zones supplied independently of each other with electrical power and in which the resistors are mounted parallel to the axis 9 of the furnace and are grouped, for example, two-by-two in such a way as to form a very large number of the longitudinal heating zones, preferably at least ten in number. As can be seen in FIG. 1, the heating elements of the cells 5 and 6 are transversely spaced from one another so as to form gaps therebetween.

Such an arrangement allows the glass sheet to be heated by longitudinal strips. The arrangement is therefore used generally for only a part of the furnace—preferably the last part, i.e., a location in which the glass sheets have already reached their plastic deformation temperature, and even a very large degree of extra heating no longer leads to a risk of causing deformations of the glass due to on the rollers, but in certain cases the differentiated heating may be commenced very early.

The multi-cell furnace according to this invention is shown in greater detail in FIG. 2, in a stepped cross-section.

The furnace is carried by a metal frame 10, standing on feet on the floor 11. The heated enclosure 12 is bounded by refractory brick walls 13, as are also the hearth and vault of the furnace, which are protected in addition by layers of light fibrous insulation 14. This furnace is equipped with a conveyor composed of a series of motor-driven rollers 15, preferably formed of hollow silica tubes faced with a fabric 16 of refractory fibers. These rollers 15 pass entirely through the furnace from side to side and are guided by roller bearings 17 disposed outside the furnace; the rollers are rotationally driven by chains 18, driven by a motor 19.

The glass sheet 20 conveyed by the rollers 15 is heated from below by resistors 21, composed of tubes of alumino-silicates, around which electrical wires 22 are wound. These tubes are mounted fixed, not passing entirely through, and extend parallel to the motorized rollers 15. In the principal section of the furnace, which corresponds to the left part of the Figure, the heated elements associated with the vault are also mounted in a fixed manner, parallel to the motor-driven rollers 15 and at a distance from them of, for example, 250 mm, and are suspended from brackets 23. Several tubes 24 are used for covering the width of the furnace, thus making up the independent transverse sub-zones.

In the differentiated heating section, shown in the right part of the Figure, there are 14 resistor tubes 25 arranged parallel to the axis of the furnace and disposed in pairs on cradles 26. They are mounted at a distance from the motor-driven rollers which can vary, for example, between 15 and 250 mm, as shown in greater detail in FIG. 3.

In this FIG. 3, it can be seen that the tubes 25 are nested in pairs at their ends on cradles 26. The electrical wires wound around tubes 25 are connected to an electrical supply via insulated pipes 27 passing through the furnace vault 28 and fixed by attachments 29 to a bar 30 also supporting the cradles 26. At the upper end of the bar 30 is screwed an attachment 31 to which a chain 32 engaging a sprocket 33 is connected. To lower the cradle, it is therefore only necessary to rotate the sprocket 33, for example by one-third of a revolution, and to stop rotation when the resistors 25 are in position. The rotation of the sprocket 33 may be performed manually or, preferably, by an automatic device controlled from the control panel for the furnace.

By varying the electrical power supplies to the different sets of electrical resistors and the height of the cradles 26, it is possible to obtain a very wide variety of heating profiles, adapted in an optimum manner to the size and shape of the panes which are to be manufactured. This variety may be still further increased if means are provided for varying the speed of travel of the glass sheet through the furnace, especially if the roller conveyor is composed of at least two independent sections, of which one corresponds to the differentiated heating section.

The furnace according to this invention makes it possible, in a relatively short length, to heat the glass sheets to exactly the desired conditions, which makes it possible to control in an optimum manner double-curving effects and/or to achieve pronounced curvatures, for example in the vicinity of the edges of the pane.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of heating moving glass sheets, comprising the steps of:

moving a glass sheet through a furnace in a moving direction;

substantially uniformly heating the glass sheet in a principal heating section of the furnace to a plastic deformation temperature thereof; and subsequently further heating selected areas of the heated glass sheet in a differential heating section of the furnace to a temperature beyond the plastic deformation temperature thereof, wherein said uniformly heating step comprises regulating power to electrical heating elements positioned in proximity to the glass sheet in said furnace so as to uniformly radiantly heat the glass sheets, said heating elements extending transverse to the moving direction, and wherein said further heating step comprises independently regulating power to selected ones of heating zones in said differential heating section and extending parallel to the moving direction, said heating zones in said differential heating section comprising further heating elements extending parallel to the moving direction, at least some of adjacent ones of said further heating elements being spaced from one another in a direction transverse to said moving direction so as to form at least one gap between said adjacent further heating elements.

2. The method of claim 1 wherein said further heating step further comprises independently regulating a height of each of said heating zones.

3. The method of claim 2 including the step of bending the further heated glass sheet.

4. The method of claim 1 including the step of bending the further heated glass sheet.

* * * * *

UNITED STATES PATENT AND TRADEMARK OFFICE
CERTIFICATE OF CORRECTION

PATENT NO. : 6,092,393

DATED : July 25, 2000

INVENTOR(S): Denis MATHIVAT et al.

It is certified that an error appears in the above-identified patent and that said Letters Patent is hereby corrected as shown below:

On the title page, item [54] and at the top of Column 1, is incorrectly listed. The Title should read as follows:

--[54] METHOD AND APPARATUS FOR HEATING MOVING GLASS SHEETS--

On the title page, item [73] is misspelled. The Assignee should be:

--[73] Assignee: Saint-Gobain Vitrage International,
Courbevoie, France--

On the title page, the CPA information has been omitted. It should read as follows:

--[*] Notice: This patent issued on a continued prosecution application filed under 37 CFR 1.53(d), and is subject to the twenty year patent term provisions of 35 U.S.C. 154(a)(2)--

On the title page, the Firm's name is incorrectly listed. It should be:

--*Attorney, Agent or Firm*--Oblon, Spivak, McClelland, Maier & Neustadt, P.C.--

Signed and Sealed this

Seventeenth Day of April, 2001

Attest:

NICHOLAS P. GODICI

*Attesting Officer*   *Acting Director of the United States Patent and Trademark Office*